United States Patent [19]

Schmid

[11] Patent Number: 4,759,633

[45] Date of Patent: Jul. 26, 1988

[54] APPARATUS AND PROCESS FOR METERING AND MIXING TWO DIFFERENT MATERIALS THAT ARE PASTY OR OF LOW TO HIGH VISCOSITY

[76] Inventor: Alfred Schmid, Kirchstrasse 59, CH-9202 Gossau, Switzerland

[21] Appl. No.: 837,288

[22] Filed: Mar. 6, 1986

[30] Foreign Application Priority Data

Oct. 21, 1985 [DE] Fed. Rep. of Germany ....... 3537381

[51] Int. Cl.⁴ .................... B01F 15/02; B01F 15/04; B01F 7/04; B67D 5/52
[52] U.S. Cl. .................................. 366/156; 222/139; 222/413; 366/162; 366/181; 366/312; 366/329
[58] Field of Search ............... 366/155, 156, 160, 162, 366/134, 181, 309, 312, 313, 325, 329, 327; 222/138, 139, 631, 263, 372, 412, 413, 568

[56] References Cited

U.S. PATENT DOCUMENTS

| | | | |
|---|---|---|---|
| 960,081 | 5/1910 | Fearon | 222/413 X |
| 1,593,517 | 7/1926 | Tharrington | 366/160 X |
| 1,808,804 | 6/1931 | Baldner et al. | 222/263 X |
| 2,847,196 | 8/1958 | Franklin et al. | 222/263 X |
| 2,895,645 | 7/1959 | Pelak | 222/263 X |
| 3,302,832 | 2/1967 | Hardman et al. | 366/162 X |
| 3,411,213 | 11/1968 | Spinello | 222/413 X |
| 3,767,085 | 10/1973 | Cannon et al. | 222/85 |
| 4,168,942 | 9/1979 | Firth | 222/413 X |
| 4,323,174 | 4/1982 | Wood | 222/413 X |
| 4,469,445 | 9/1984 | Wurtz | 366/313 X |
| 4,583,842 | 4/1986 | Shimono et al. | 366/316 X |

FOREIGN PATENT DOCUMENTS 0087029 2/1983 European Pat. Off. .

Primary Examiner—Harvey C. Hornsby
Assistant Examiner—Scott J. Haugland
Attorney, Agent, or Firm—Wenderoth, Lind & Ponack

[57] ABSTRACT

An apparatus for metering and mixing two different materials that are pasty or of low to high viscosity, includes a device for simultaneously delivering the materials from storage vessels to a mixing chamber, and a member for mixing the two materials in the mixing chamber, the mixing member and the mixing chamber, if necessary, being constructed as disposable items. The apparatus permits such materials to be mixed and metered with precision and has relatively few moving mechanical components, is of simple design, and even enables materials that react with each other to be mixed at room temperature without excessive heating during the mixing process. The device for delivering and metering the two mate includes screws mounted on a common drive shaft, provided with opposed stators and located in separate casings.

17 Claims, 2 Drawing Sheets

APPARATUS AND PROCESS FOR METERING AND MIXING TWO DIFFERENT MATERIALS THAT ARE PASTY OR OF LOW TO HIGH VISCOSITY

BACKGROUND OF THE INVENTION

The invention relates to an apparatus and a process for mixing two different materials that are pasty or of low to high viscosity, comprising two storage vessels for the two materials, an apparatus for simultaneously delivering the materials from the storage vessels to a mixing chamber, and a facility or member for mixing the two materials in the mixing chamber, with the mixing facility and the mixing chamber, if necessary, being formed as detachable disposable items.

European Patent Application No. 83.101.068.1, publication No. 0 087 029 A1, discloses an apparatus for mixing dental materials, in which two different materials that are pasty or of low to high viscosity are fed simultaneously in measured portions from two storage vessels to a mixing head, and are mixed therein. Here, the mixing head with the agitator or mixing member placed therein is designed as a disposable item. In addition, U.S. Pat. No. 3,767,085 discloses an apparatus in which two different materials are likewise fed in measured portions from two cartridges to a mixer which may be formed as a disposable item, and mixed therein. In these two prior art devices, the two different materials that are to be mixed are contained in cartridges and can be squeezed out by means of a coupled double-piston device. Still another embodiment is shown in the European patent application, according to which the different materials contained in two tubular containers are pressed out by squeezing the tubes together.

SUMMARY OF THE INVENTION

The present invention has as its object the provision of an apparatus and a process for mixing and metering two different materials, wherein the two materials can be mixed and metered more simply, i.e, with less mechanical effort, wherein the two materials can be metered with precision by varying, if necessary, the mixing ratio within desired limits, and wherein the mixing of the two materials occurs under such mild conditions that, in the case of materials that cure under heat, premature curing of the materials does not occur as a result of the input of excessive mechanical energy which becomes converted into thermal energy.

This problem is solved by the apparatus of the invention which has facility for delivering and metering the two materials and includes screws mounted on a common drive shaft and having opposed stators located in separate casings, if necessary.

The invention also relates to a process for metering and mixing two different materials that are pasty or of low to high viscosity, by simultaneously delivering the materials, stored in two separate storage vessels, to a common mixing chamber, and pressing them out of the mixing chamber, wherein the two materials are introduced into the mixing chamber in measured portions by means of two screws mounted on a common drive shaft and having opposed stators located in separate casings, if necessary.

The advantages of the device and the process of the invention are, first of all, seen in the fact that only a single drive means is needed to deliver and to meter the two different compounds to be mixed, said drive means advantageously driving not only the member achieving metering, but also the member achieving mixing. Since the metering member, i.e., the screws mounted on a common drive shaft, rotates only at a relatively low speed as the two compounds are metered into the mixing chamber, the mixing member, i.e., the agitator, also may be rotated at only a low speed in the mixing chamber. The mixing member has a special design so as to allow mixing even at a relatively low agitation speed in order to prevent with assurance any excessive heat due to the conversion of the resulting mechanical agitation energy and thereby a premature curing in the case of materials that are able to react with one another. Another advantage of the apparatus and the process embodying the invention is the fact that not only pasty, but also viscous, i.e. ropy, materials, for instance with a consistency like that of viscous honey, can still be properly metered at precisely controlled mixing ratios, i.e. a mixing ratio of, say, 1:1 by volume, with a high degree of precision even for such viscous or ropy materials. Another advantage of the apparatus and process of the invention is the fact that simple cartridges, if necessary with an internally movable springloaded plunger or a ventilated screw lid, can be used as storage vessels for the two different materials. Because of the simple design of these storage vessels for the materials, no special facilities are needed for filling them. By way of example, these storage vessels can be filled on automatic tube-filling machines. It is likewise possible, in the case of viscous materials that are still flowing spontaneously, to fill the storage vessels from refill containers.

Another advantage is the fact that, because of the precise metering resulting from the two screws mounted on one drive shaft, no particularly high pressure needs to be applied to the storage vessels, so that they can be made of inexpensive materials, because they will not be deformed during the operation of the device embodying the invention.

In the case of flowable materials, particularly those with a low viscosity, it is of advantage to provide an automatic shut-off device in the passage from the screw casing to the mixing chamber in order to avoid the continued spontaneous outflow of the flowable materials to the mixing chamber due to the force of gravity. For example, a shut-off device of this type may consist of a spring-loaded ball or plate that snugly fits into a seat.

The metering ratio between the two materials can be varied over a wide range, e.g., between 1:20 and 20:1. As a rule, however, the metering ratio is between 1:1 and 1:10, for example for curing materials. The metering ratio can be adjusted by using screws with stators of different helix angles or screws with different spiral depths, but according to an advantageous embodiment, control elements such as screws or valves are provided in the supply ducts through which the materials move from the screw casing to the mixing chamber for the adjustment, particularly the fine adjustment, of the metering ratio.

In the case of materials that react with each other, it is necessary, with materials that even at standard temperature will cure in a relatively short time, e.g., within minutes or hours, that a seal be provided between the two screw casings and the drive shaft, so that the two materials only come into contact with each other in the mixing chamber. In the case of materials that do not react chemically at standard, i.e. room, temperature, or materials that do not react with each other at all, this seal can be dispensed with. Advantageously, the seal consists of an O-ring which is interposed between the two casings or parts of casings for the two screws.

According to another preferred embodiment of the invention, the supply ducts for the two different materials, which lead to the mixing chamber, can have different diameters, either for proper matching to the viscosities of the two materials, which may be similar or dissimilar, or in the case of mixing ratios other than 1:1, to allow the materials to pass in properly metered quantities to the mixing chamber.

According to another preferred embodiment of the invention, the drive for the two screws on the common drive shaft and the drive for the mixing facility, i.e. the agitator, are coupled together, so that the mixing facility is turned relatively slowly. However, it is also possible to provide a separate drive for the mixing facility on the drive for the two screws. This drive can be operated either manually, for example by means of a crank, or it can also be driven by a motor, preferably an electric motor. In such a case, a suitably geared-down gear unit can be placed between the motor and the drive shaft. By means of suitable control elements, the rotational speed of the drive shaft can be regulated and, if necessary, also measured and, if desired, displayed.

As described earlier, one advantage of the novel mixing facility or member of the invention is the fact that in the case of materials that react with each other under heat or especially even at room temperature, excessive heating in the mixing chamber is prevented, so that, in order to achieve a sufficiently long pot life, premature curing of the compound will not occur. This applies especially to so-called two-component materials, where at least one of the components contains a catalyst. In such materials, a chemical reaction occurs between monomers (or incompletely converted oligomers or polymers) containing reactive groups, and a second component. Such systems are sensitive to the addition of a catalyst and require that the mixing ratio of the two components be kept within accurately prescribed limits, which might give rise to metering problems. However, in such systems, the mixing must also occur quickly, homogeneously, and without bubbles.

In order to ensure proper mixing when the mixing facility, e.g. an agitator, is rotating at a relatively low speed, the agitator in one preferred embodiment consists of a stripper agitator, which slides against the walls of the mixing chamber, scrapes off any materials adhering thereto and, because of its shape, delivers them to the center of the mixing chamber. According to another preferred embodiment, in addition to these scrapers, which abut against the wall of the mixing chamber, blades fixed statically in the mixing chamber are likewise provided. They are located more towards the center of the mixing chamber. According to yet another preferred embodiment, these blades are also attached to the rotating mixing facility and are shaped such that the materials to be mixed, which are wiped off the wall of the mixing chamber by the scrapers, continue, as it were, to be kneaded together in the inner part of the mixing chamber, so that this central zone of the mixing chamber is also utilized as a mixing zone. In these embodiments, the materials can be mixed such that the mixed material undergoes the maximum turbulence with the least possible loss of energy due to internal friction, without causing excessive internal friction on account of the overly rapid rotation of a conventional agitator, which might lead to premature curing of the compound or even in an increase in the delivered quantity as a result of a reduction in the flow resistance, in cases where the mixed compound is made highly liquid by the heat supplied. A particular advantage is achieved by offering the lowest possible resistance to the free passage of a pasty compound from the supply ducts to the outlet opening of the mixing facility. Therefore, the mixing facility, i.e., the mixing tool, should occupy a small portion of the central axis of the mixing chamber, and it is important that the walls of the mixing chamber be wiped clean. Furthermore, even if the rotational speed of the mixing facility is low, the turbulence should be as high as possible in order to further the delivery of material to the center, so that, if required, material may also be returned counter to the general direction of flow of the compound in the mixing chamber.

In one embodiment of the apparatus of the invention, in which the drive for the two screws on the drive shaft and for the mixing facility are coupled together, an optimum ratio of the mixing motions to the delivered quantity can be set. It goes without saying that the rotational speed of the screws, on the one hand, and the rotational speed of the mixing facility, on the other, do not need to be identical, but may also have a predetermined relationship to one another by means of a mechanical coupling in itself known.

Advantageously, the mixing chamber and the mixing facility, i.e. the agitator proper, are designed as disposable items. This is especially necessary in the case of materials that react with each other, because the residues of the mixed materials remaining in the mixing chamber and in the mixing facility would cure, and it would be impossible to reuse the mixing facility any time subsequent to curing. Advantageously, the mixing facility is attached in an easily removable fashion, e.g., by means of a bayonet lock, as described in the above-mentioned European Pat. No. 0 087 029, on the drive shaft, e.g., by slipping it on a square shaft. A suitable seal, e.g., an O-ring, can be inserted between the mixing chamber and the attachment thereto. However, with components of synthetic material, the fit may be designed such that a seal automatically results. Advantageously, a seal, e.g. an O-ring, is provided around the drive shaft for the mixing facility toward the casing thereof.

In yet another preferred embodiment in which the apparatus of the invention is driven by means of a hand crank, the latter is positively connected to the drive shaft, such that this drive shaft can be rotated in one direction only, namely, in the direction in which the metering and mixing of the two materials takes place. This eliminates the possibility that material that has already been mixed is sucked back into the supply ducts as a result of an accidental or inadvertent backward turning of the hand crank, which, in the case of a curable material, could lead to curing, and thereby to clogging, in the supply ducts.

In such an embodiment, the hand crank is positively connected to the drive shaft via an idler, so that if, at the end of a metering and mixing process, the hand crank is not in a position with the lowest possible center of gravity, it will spontaneously pass to said position with the lowest possible center of gravity, i.e., it will not be forced backwards of gravity.

In still another preferred embodiment of the invention, the mixing chamber is equipped with cams which mesh with a female bayonet coupling for attachment to the mixing facility, thereby preventing the mixing chamber from being rotated during the mixing process.

In yet another preferred embodiment of the invention, the mixing chamber is inclined downward at a 15° to 40° angle in relation to the outlet opening. This results in the advantage of facilitating the filling of, e.g., a vessel or a spoon with the mixed material.

In yet another embodiment of the invention, the outlet end of the mixing chamber has an fitting to which, e.g., a nozzle to be filled with the mixed material can be attached. Experiments have shown that it is very easy to fill a fitted nozzle with a mixed material. This is particularly advantageous in the case of impression materials for dental purposes, especially silicone materials.

In yet another embodiment of the invention, the storage vessels for the two materials to be metered and mixed are cartridges that are sealed before use. Such a cartridge can have a sealed fitting for attachment to the apparatus and which is opened before attachment, for example, by being cut off, and it can also have at the other end a movable cap which acts like a piston, and which is automatically pulled downward as the material is withdrawn from the cartridge when the apparatus is actuated.

The viscosity of the materials which can be processed in the apparatus incorporating the invention can have values of approximately 20,000 cps for low-viscosity materials to values of approximately $10^6$ cps for higher-viscosity materials, said values being measured at 23° C. with a Brookfield viscosimeter.

BRIEF DESCRIPTION OF THE DRAWINGS

The invention will now be described in greater detail with reference to the drawings, in which.

DETAILED DESCRIPTION OF THE INVENTION

Figure 1:
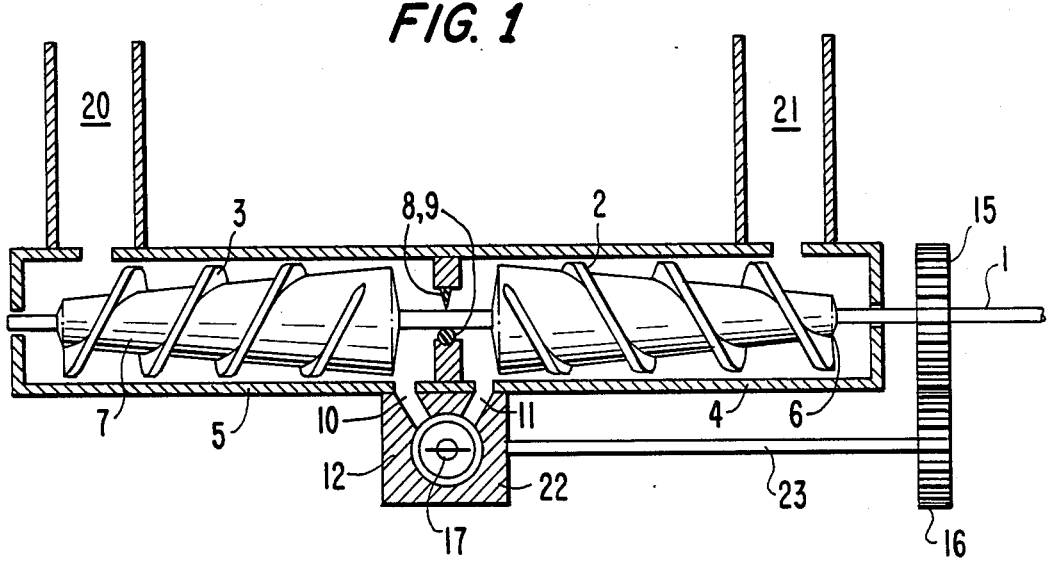
FIG. 1 is a front view in section of the apparatus according to the invention.

FIG. 1 shows the apparatus of the invention seen from the front and in section. In two casings 4, 5 there are located on a drive shaft 1 two screws or screw conveyors 6, 7 with opposed stators or screw helics. In this embodiment, the two casings 4, 5 are made of one piece. Between the two casings 4, 5 is a seal, the upper part of which is represented by a lip seal 8, while in the lower part of FIG. 1 this seal is represented by an O-ring 9. On the two casings 4, 5 are located storage vessels or chambers 21, 20 for the two different materials to be metered and mixed. In the embodiment shown, the screws 6, 7 have tapered minor diameters that increase in the direction of feed, so that the quantity delivered is fixed. In the center of the apparatus are provided supply ducts 10, 11 leading from the interiors of the two screw casings 4, 5 to a mixing chamber 12. The mixing chamber is removable, i.e. designed as a disposable item, as will be described in greater detail with reference to FIG. 2. The mixing chamber 12 is supported by retaining means 22 in which some of the supply ducts 10, 11 are also formed. The mixing member is designated 17.

Figure 2:
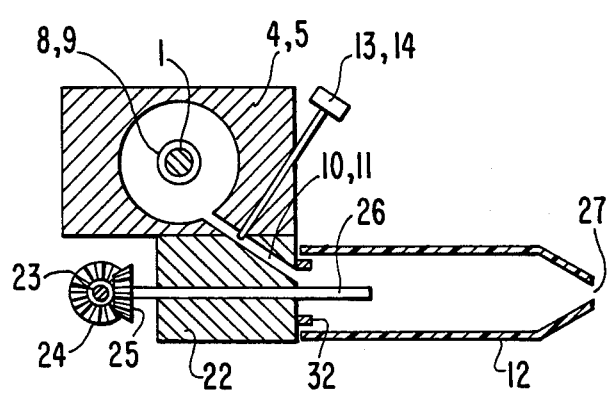
FIG. 2 is a a transverse section through FIG. 1, in which for clarity all the central areas of FIG. 1, i.e. different section planes, are illustrated.

FIG. 2 shows a section roughly through the center of the apparatus depicted in FIG. 1, in which several planes are shown to represent all details of the apparatus. All that is shown in the casings 4, 5 is the drive shaft 1 and the seal 8 or the O-ring 9. From the casings 4, 5, the supply ducts 10, 11 lead to the retaining means 22 for the mixing chamber 12 and the mixing member 17. In the supply ducts are disposed control elements 13, 14, in this case screw values, by means of which a fine adjustment can be made of the total flows.

FIG. 1 also shows, on the drive shaft 1 outside the casing 4, a gear 15 in mesh with a gear 16 which drives a shaft 23. As is apparent from FIG. 2, there is located on this shaft 23 a bevel gear 24 in mesh with a bevel gear 25. A shaft 26 for driving the mixing member (not shown in FIG. 2 for better clarity) is driven by the bevel gear 25. The free end of the shaft 26 is shown as a square to which the mixing member 17 can be attached. On the retaining means 22 is an annular fitting 32 to which the mixing chamber 12 can be attached. The mixing chamber 12, which preferably is made of synthetic material, has an outlet opening 27.

Figure 3:
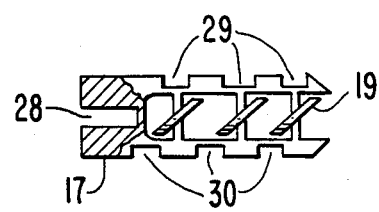
FIG. 3 is an enlarged sectional view of an embodiment of a mixing member.
Figure 4:
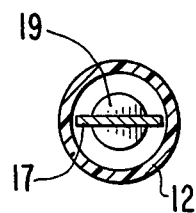
FIG. 4 is a transverse section of the mixing member of FIG. 3 shown inside a mixing chamber.

FIG. 3 shows an embodiment of a mixing member, having a recess 28 into which, during attachment, the free end of the shaft 26 is inserted. In addition, the mixing member 17 has lateral outwardly projecting components 29 and 30, staggered with respect to each other. The dimensions of the mixing member 17 are such that it can be fitted snugly into the mixing chamber 12, i.e. the gap between the outwardly projecting components of the mixing member 17 and the inner wall of the mixing chamber 12 is as small as possible. Furthermore, the mixing member shown in FIGS. 3 and 4, FIG. 4 being a section through FIG. 3 but also showing the mixing chamber 12, also has blades 19 placed in the center and which, in the embodiment shown, are arranged at an angle to the axis of rotation to ensure thorough mixing of the materials in the mixing chamber, even in the central zones.

Figure 5:
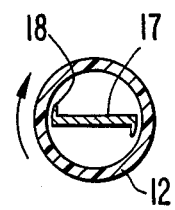
FIG. 5 is a similar view of another embodiment of a mixing member.

FIG. 5 shows another embodiment of a mixing member 17 in a mixing chamber 12, in this case provided with scrapers 18 at the outer edges of the mixing member 17 to wipe the materials off the inner wall of the mixing chamber 12. The direction of rotation is indicated by an arrow.

Figure 6:
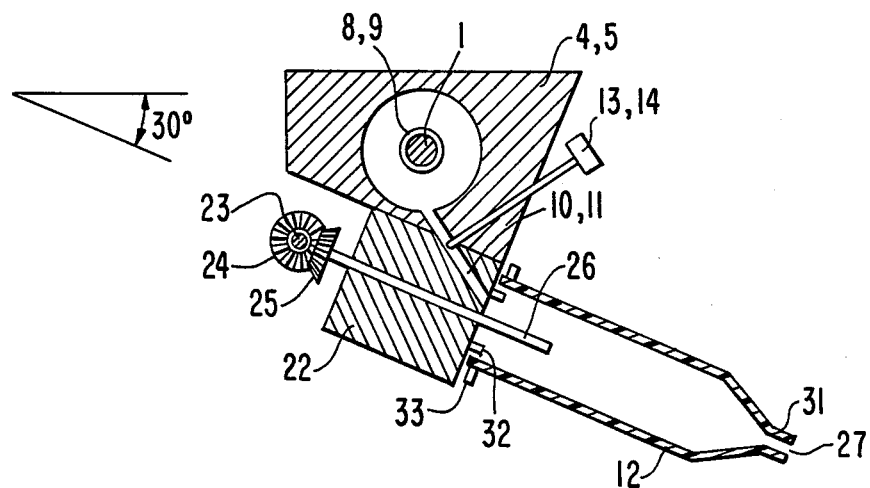
FIG. 6 is a view similar to FIG. 2 of another embodiment in which the mixing member and mixing chamber point downwardly at a 30° angle, and the mixing chamber has a fitting for attaching a nozzle and cams for preventing the mixing chamber from being rotated during mixing.

In FIG. 6, which essentially corresponds to the arrangement in FIG. 2, the mixing member 17, the retaining means 22 and the mixing chamber 12 are angled downwardly an angle of approximately 30°. This is accomplished by providing the casings 4 and 5 with a trapezoidal cross section. Moreover, the outlet opening 27 of the mixing chamber has another fitting 31 to which a nozzle or a hose can be attached to receive the mixed material. FIG. 6 also shows an arrangement in which rotation of the mixing chamber 12 during the mixing process is prevented on account of the fact that the mixing chamber has cams 33 which can engage in corresponding cutouts in a bayonet nut (not illustrated in FIG. 6) on retaining means 22.

Figure 7:
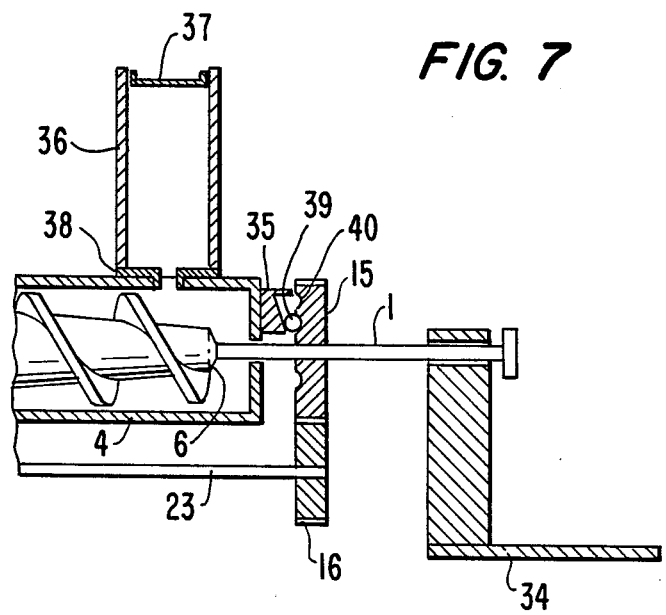
FIG. 7 is a partial view similar to FIG. 1 of another embodiment in which a hand crank is coupled via an idler to a drive shaft and wherein a storage vessel is sealed with a cap.

FIG. 7 shows an embodiment with a hand crank and an idler. The hand crank 34 attached to the drive shaft 1 drives the gear 15, which has appropriate circular cutouts 40 in which can engage the balls 39 which move in an oblique cage-like component 35. Thereby, the hand crank 34 can be turned in one direction only, because when the hand crank 34 is turned in the opposite direction, i.e. in reverse, such reverse movement is blocked due to the engagement of ball 39 in the cut-out or depression 40 and the run-on thereof on the oblique plane of the cage-like component 35. Nonetheless, instead of the locking mechanism depicted in FIG. 7, it is likewise possible to provide for a different idler mechanism, e.g., a ratchet gearing.

FIG. 7 also shows an arrangement of the apparatus in which the storage vessel has the form of a cartridge 36, which is attached at a lower part 38 thereof to the casing 4, e.g. by screwing it thereonto, and sealing of the cartridge 36 from the atmosphere at the top by means of a slidable cover 37. This makes it particularly easy to supply the apparatus embodying the invention with the two materials to be metered and mixed.

What is claimed is:

1. In an apparatus for metering and mixing in precise desired proportional ratios two different materials that are pasty or of low to high viscosity, said apparatus including two storage vessels for the two materials, a mixing chamber, means for simultaneously delivering metered portions of the two materials from said two storage vessels to said mixing chamber, and means within said mixing chamber for rotation therein for mixing said metered portions of the two materials, the improvement of means for controlling the mechanical energy required for said delivering and said mixing and thereby for regulating the heat input the two materials resulting from the conversion of said mechanical energy to thermal energy, said controlling means comprising said delivering means including:
   two casings having interiors connected to respective said storage vessels;
   a single drive shaft extending through said interiors of said two casings;
   two screw conveyors fixed to said drive shaft within respective said casing interiors, said two screw conveyors having opposed screw helices;
   seal means surrounding said drive shaft and isolating said interiors of said two casings to prevent contact between the two materials within said interiors of said two casings;
   two supply ducts extending from respective said casing interiors to said mixing chamber; and
   means for rotating said drive shaft and thereby said two screw conveyors to cause said helices thereof to deliver said metered portions of the two materials from respective said casing interiors through respective said supply ducts into said mixing chamber.

2. The improvement claimed in claim 1, wherein said mixing chamber and said mixing means are detachably mounted on said casings as disposable elements.

3. The improvement claimed in claim 1, wherein said screw helices have respective helix angles adjusted to match the proportional ratio between said metered portions of the two materials.

4. The improvement claimed in claim 1, wherein said drive shaft and said two screw conveyors are formed of synthetic material.

5. The improvement claimed in claim 4, wherein said drive shaft and said two screw conveyors are formed integrally as a single component.

6. The improvement claimed in claim 1, wherein said seal means comprises an O-ring.

7. The improvement claimed in claim 1, wherein said two supply ducts have different diameters.

8. The improvement claimed in claim 1, further comprising means, within each of said supply ducts, for adjusting the quantity of the respective material passing therethrough.

9. The improvement claimed in claim 8, wherein each said adjusting means comprises a valve.

10. The improvement claimed in claim 1, further comprising means, operable in response to said rotating means, for rotating said mixing means within said mixing chamber at a speed proportional to the speed of rotation of said drive shaft.

11. The improvement claimed in claim 1, wherein said mixing means comprises an agitator mounted within said mixing chamber for rotation about a rotational axis, and said agitator has extending therefrom scraper means for wiping an interior wall of said mixing chamber to scrape therefrom a mixture of the materials.

12. The improvement claimed in claim 11, wherein said agitator further includes mixing blades intersecting said rotational axis and extending at an angle thereto.

13. The improvement claimed in claim 12, wherein said angle is acute.

14. The improvement claimed in claim 1, further comprising means mounting said mixing chamber fixedly with respect to said two casings for preventing rotation of said mixing chamber during rotation of said mixing means.

15. In a process for metering and mixing in precise desired proportional ratios two different materials that are pasty or of low to high viscosity, said process including simultaneously delivering metered portions of said two materials from two respective storage vessels into a mixing chamber, mixing said metered portions within said mixing chamber, and dispensing the resultant mixture from said mixing chamber, the improvement of controlling the mechanical energy required for said delivering and said mixing and thereby regulating the heat input of said two materials resulting from the conversion of said mechanical energy to thermal energy, said controlling comprising conducting said delivering by:
   providing a delivering means including two casings having interiors connected to respective said storage vessels, a single drive shaft extending through said interiors of said two casings, two screw conveyors fixed to said drive shaft within respective said casing interiors, said two screw conveyors having opposed screw helices, and two supply ducts extending from respective said casing interiors to said mixing chamber;
   rotating said drive shaft and thereby said two screw conveyors and thereby causing said helices thereof to deliver said metered portions of said two materials from respective said casing interiors through respective said supply ducts into said mixing chamber; and
   isolating said interiors of said two casings from each other by a seal surrounding said drive shaft and thereby preventing contact between said two materials within said interiors of said two casings.

16. The improvement claimed in claim 15, comprising controlling the speed of rotation of said drive shaft to reduce internal friction and thereby minimize heating of said two materials.

17. The improvement claimed in claim 15, wherein said mixing comprises rotating a mixing element having scrapers and mixing blades within said mixing chamber, and further comprising correlating said rotation of said drive shaft and said rotation of said mixing element such that the speeds of rotation thereof are proportional.

* * * * *